(12) United States Patent  
Kariya

(10) Patent No.: US 9,455,936 B2  
(45) Date of Patent: Sep. 27, 2016

(54) NETWORK RELAY DEVICE

(71) Applicant: Hitachi Metals, Ltd., Minato-ku, Tokyo (JP)

(72) Inventor: Kazutoshi Kariya, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 61 days.

(21) Appl. No.: 14/246,539

(22) Filed: Apr. 7, 2014

(65) Prior Publication Data

US 2014/0321458 A1    Oct. 30, 2014

(30) Foreign Application Priority Data

Apr. 30, 2013    (JP) .................................. 2013-095177

(51) Int. Cl.
  *H04L 12/935*    (2013.01)
  *H04L 12/931*    (2013.01)
  *H04L 12/46*    (2006.01)

(52) U.S. Cl.
  CPC ....... *H04L 49/3009* (2013.01); *H04L 12/4645* (2013.01); *H04L 49/205* (2013.01); *H04L 49/354* (2013.01)

(58) Field of Classification Search
  CPC ............... H04L 49/205; H04L 49/354; H04L 49/3009; H04L 12/4645; H04L 12/5689
  See application file for complete search history.

(56) References Cited

U.S. PATENT DOCUMENTS

| | | | | |
|---|---|---|---|---|
| 8,325,745 | B2* | 12/2012 | Sainomoto | 370/401 |
| 2002/0169937 | A1* | 11/2002 | Kagawa | 711/206 |
| 2010/0135307 | A1* | 6/2010 | Nakagawa | 370/395.53 |
| 2010/0316053 | A1* | 12/2010 | Miyoshi et al. | 370/392 |
| 2011/0002337 | A1* | 1/2011 | Akahane et al. | 370/395.53 |
| 2011/0261827 | A1* | 10/2011 | Armstrong et al. | 370/401 |
| 2012/0250684 | A1 | 10/2012 | Ogura | |

FOREIGN PATENT DOCUMENTS

| | | |
|---|---|---|
| JP | 2011-91477 A | 5/2011 |
| JP | 2012-130084 A | 7/2012 |
| JP | 2012-209855 A | 10/2012 |

OTHER PUBLICATIONS

Japanese Office Action issued in counterpart Japanese Application No. 2013-095177 dated Apr. 19, 2016 with English translation (six pages).

* cited by examiner

*Primary Examiner* — Habte Mered  
(74) *Attorney, Agent, or Firm* — Crowell & Moring LLP

(57) ABSTRACT

A network relay device capable of shortening retrieval time for an address table or reducing a capacity of the address table is provided. When a transmission-source address of a frame received at first and second port groups is learned, a frame processing unit performs a hash calculation by using the transmission-source address and a first internal identifier 0.1. Then, an internal identifier etc., corresponding to the receiving port is registered in an entry inside an address table obtained by the hash calculation. On the other hand, when a transmission-destination address of a frame received at the first and second pot groups is retrieved, the frame processing unit performs a hash calculation by using the transmission-destination address and 0.1, reads out an entry inside the address table obtained by the hash calculation, and compares the internal identifier inside the address table with an internal identifier corresponding to the receiving port.

5 Claims, 7 Drawing Sheets

| SELF-IVID OF PORT AT WHICH FRAME HAS BEEN RECEIVED | IVID FOR FDB HASH CALCULATION | IVID OF ENTRY IN FDB |
|---|---|---|
| 0.1 | 0.1 | 0.1 |
| 0.2 | 0.1 | 0.2 |
| 0.3 | 0.3 | 0.3 |

QOSTBL

| SELF-IVID | ADDR | QOS_VLD | OTHER IVID | FDB_SEL |
|---|---|---|---|---|
| 0.1 | 0x30001 | 1 | 0.2 | 1(or0) |
| 0.2 | 0x30002 | 1 | 0.1 | 0(or1) |
| 0.3 | 0x30003 | 0 | - | - |

NETWORK RELAY DEVICE

CROSS-REFERENCE TO RELATED APPLICATION

The present application claims priority from Japanese Patent Application No. 2013-095177 filed on Apr. 30, 2013, the content of which is hereby incorporated by reference into this application.

TECHNICAL FIELD OF THE INVENTION

The present invention relates to a network relay device. For example, the present invention relates to a network relay device having a function that assigns a plurality of ports to groups and that limits a communication band for relay of a frame among the respective groups.

BACKGROUND OF THE INVENTION

For example, Japanese Patent Application Laid-Open Publication No. 2011-91477 (Patent Document 1) describes a method of synchronizing a plurality of forwarding databases (FDBs) with each other in a chassis-type switching hub. More specifically, each of line cards generates a learning-use frame when a registered content of each FDB is changed, and the learning-use frame is transmitted toward the other line card while a transmission rate is controlled. Japanese Patent Application Laid-Open Publication No. 2012-209855 (Patent Document 2) describes a method of effectively learning the FDB in the chassis-type switching hub. More specifically, a representative line card is determined, and each line card enables the representative line card to perform a learning process based on a learning notification when the FDB information of a received packet has not been learned yet, and then, the FDB of its own is updated based on a learning notification transmitted in multicast transmission from the representative line card. The representative line card limits a flow rate in the multicast transmission.

In a frame relay device that divides the same VLAN into two subnets for management, Japanese Patent Application Laid-Open Publication No. 2012-130084 (Patent Document 3) describes a method of distinguishing a communication inside the same subnet from a communication between the subnets. More specifically, if flooding occurs for the frame received at a first domain processing unit corresponding to a first subnet, a learning table of the first domain processing unit learns a transmission-source address of the frame together with a flag "0", and a learning table of a second domain processing unit corresponding to a second subnet learns the transmission-source address together with a flag "1". When an address is retrieved, it is distinguished whether the transmission address is inside the same subnet or not, by a value of the flag. Also, the frame relay device limits a band in communication between the subnets.

SUMMARY OF THE INVENTION

For example, as represented by a VLAN (Virtual Local Area Network) or others, a technique of structuring a plurality of broadcast domains in one switching device (network relay device) has been known. However, a communication provider or others desires sometimes to limit a communication band for apart of the relay when the frame is relayed inside the same broadcast domain. A case is cited, for example, in which the communication provider desires to limit the communication band when the frame is relayed between some groups inside an organization while assigning the same broadcast domain to the organization regarded as one unit.

In such a case, it is beneficial to, for example, use a switching device having a communication band limiting function inside the device. The communication band limiting function is a function that assigns a plurality of ports to the groups inside the device separately from the broadcast domain, and besides, that limits the communication band for the relay of the frame between any groups. This function itself for limiting the communication band is normally referred to as QoS (Quality of Service) or others.

In the switching device having the communication band-limiting function, it is required to determine that the frame is to be relayed so as to be either inside the same group or be bridged between the groups. Such determination is made by, for example, the method disclosed in the Patent Document 3. However, in the technique of the Patent Document 3, there are such risks that a large capacity is required for an address table, and that its retrieval time is also increased. Accordingly, the present inventor or others have studied a system for the determination as described above while managing the address table by using a hash function. In the case of using the hash function, normally, it is considered to provide the address table in which each of the above-described groups is set as a unit. However, in this case, there is a risk of insufficient effect for the retrieval time and the capacity of the address table.

The present invention has been made in consideration of such circumstances, and one of preferred aims of the present invention is to provide a network relay device capable of shortening the retrieval time of the address table or reducing the capacity of the address table. The above and other preferred aims and novel characteristics of the present invention will be apparent from the description of the present specification and the accompanying drawings.

The typical embodiment of the inventions disclosed in the present application will be briefly described as follows.

A network relay device according to the present embodiment is provided with: a plurality of ports including a first port group to which a first internal identifier is set and a second port group to which a second internal identifier is set; an address table; and a frame processing unit for relaying a frame among the plurality of ports based on the address table. When the transmission-source address of the frame received at the first and second port groups is learned, the frame processing unit performs a hash calculation by using the transmission-source address and one internal identifier of the first and second internal identifiers. Then, in an entry inside the address table obtained by the hash calculation, the frame processing unit registers the transmission-source address, the identifier of the port at which the frame has been received, and the internal identifier which is set to the port group to which the port belongs. On the other hand, when a transmission-destination address of the frame received at the first and second port groups is retrieved, the frame processing unit performs a hash calculation by using the transmission-destination address and the same one internal identifier as used in the above-described learning process. Then, the frame processing unit reads out the entry inside the address table obtained by the hash calculation, and compares the internal identifier registered in the entry with the internal identifier set to the port group to which the frame-receiving port belongs, so that it is determined that the frame is to be relayed so as to be either inside the same port group or be bridged between the port groups.

When the effects obtained by the typical embodiment of the present invention disclosed in the present application are briefly described, the retrieval time of the address table can be shortened in the network relay device, or the capacity of the address table can be reduced therein.

BRIEF DESCRIPTIONS OF THE DRAWINGS

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail based on the accompanying drawings. Note that the same components are denoted by the same reference symbols throughout all drawings for describing the embodiments, and the repetitive description thereof will be omitted.

<<Communication Band Limiting Function of Network Relay Device>>

Figure 1:
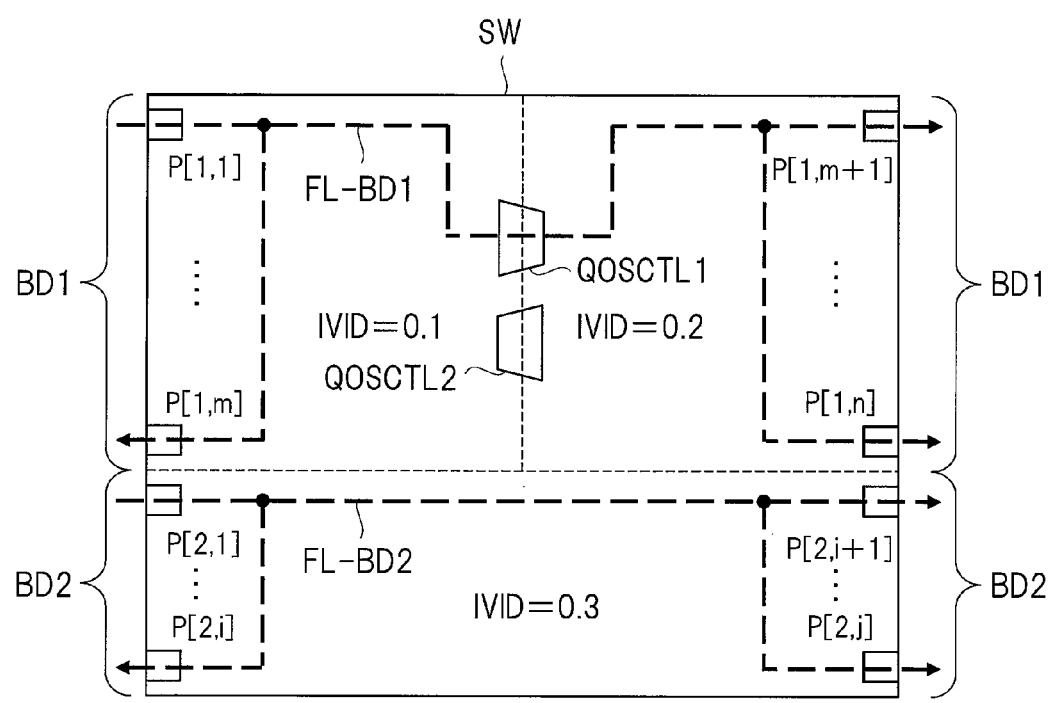
FIG. 1 is a schematic diagram illustrating a structural example of a network relay device according to one embodiment of the present invention, and an operational example of a communication band limiting function of the network relay device.

FIG. 1 is a schematic diagram illustrating a structural example of a network relay device according to one embodiment of the present invention, and an operational example of a communication band limiting function of the network relay device. A switching device (network relay device) SW illustrated in FIG. 1 is provided with a plurality of ports P[1, 1] to P[1, n] and P[2, 1] to P[2, j] and communication band limiting units QOSCTL1 and QOSCTL2. In this example, the P[1, 1] to P[1, n] belong to the same broadcast domain BD1, and the P[2, 1] to P[2, j] belong to the same broadcast domain BD2 that is different from the BD1. More specifically, for example, the same VLAN is set to the BD1, and the same VLAN that is different from that of the BD1 is set to the BD2.

Inside the device, internal identifiers IVIDs that are different from each other are set to the P[1, 1] to P[1, m] (first port group) and the P[1, m+1] to P[1, n] (second port group) among the plurality of ports P[1, 1] to P[1, n] belonging to the broadcast domain BD1, respectively. A relation of "IVID=0.1" is set to the first port group as the first internal identifier, and a relation of "IVID=0.2" is set in the second port group as the second internal identifier. Moreover, inside the device, a relation of "IVID=0.3" is also set to the plurality of ports P[2, 1] to P[2, j] as an internal identifier that is different from the first and second internal identifiers.

In such a configuration, for example, if flooding occurs for a frame FL-BD1 received at the port P[1, 1], the FL-BD1 is flooded to ports among the plurality of ports P[1, 1] to P[1, n] that belong to the broadcast domain BD1 except for the P[1, 1]. Similarly, if flooding occurs for a frame FL-BD2 received at the port P[2, 1], the FL-BD2 is flooded to ports among the plurality of ports P[2, 1] to P[2, j] that belong to the broadcast domain BD2 except for the P[2, 1].

In this case, in the switching device SW of FIG. 1, the communication band limiting function is set so that, when a frame is to be relayed so as to be bridged between previously-set predetermined port groups, a communication band of the frame received at one of the port groups (in this case, the first port group) is limited, and then, the frame is relayed to the other of the port groups (in this case, the second port group). In accordance with this setting, the SW limits the communication band of the frame FL-BD1 received at the first port group (for example, P[1, 1]) by using the communication band limiting unit QOSCTL1, and then, relays the frame to the second port group (P[1, m+1] to P[1, n]).

Moreover, when the frame is relayed inside the same port group (for example, the first port group), the switching device SW does not limit the communication band of the frame FL-BD1 received at any port (for example, P[1, 1]) inside the same port group, and relays the frame to any other port (for example, P[1, m] or others). As contrary to the communication band limiting unit QOSCTL1, note that the communication band limiting unit QOSCTL2 limits the communication band of the frame when the frame is relayed from the second port group toward the first port group. The communication band limiting function can also determine a limiting source and a limiting destination in the limitation of the communication band, and also can set to use only either the QOSCTL1 or the QOSCTL2 depending on cases.

<<Relay Operation of Network Relay Device (Comparative Example)>>

Figure 9:
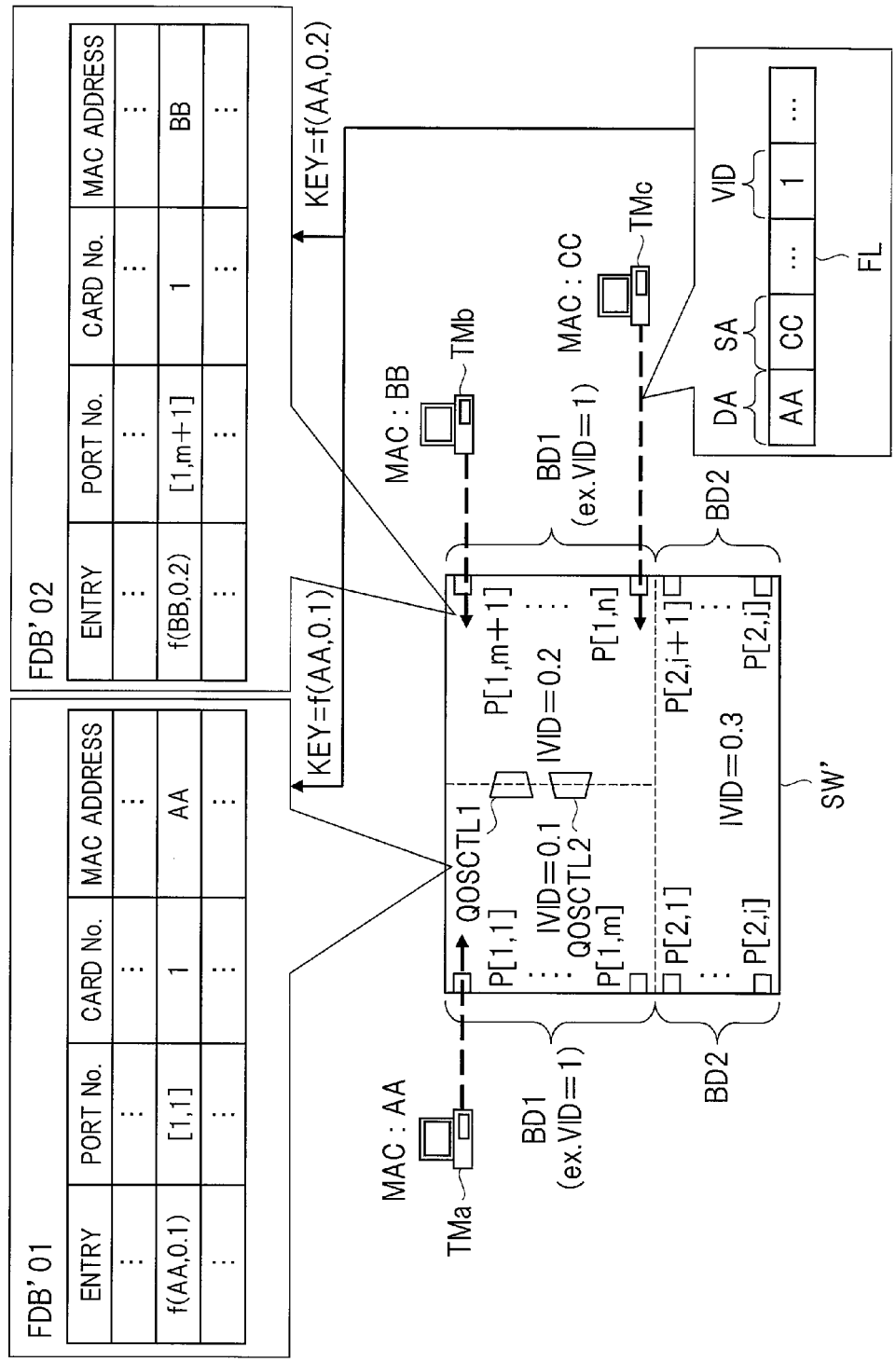
FIG. 9 is a schematic diagram illustrating one example of a relay operation of a network relay device studied as a premise of the present invention.

Here, prior to detailed explanations for the network relay device of the present embodiment, a network relay device as a comparative example will be explained. FIG. 9 is a schematic diagram illustrating one example of a relay operation of the network relay device studied as the premise of the present invention. FIG. 9 illustrates a switching device SW' having the same configuration as that of the switching device SW explained in FIG. 1. First, a method of learning a transmission-source address in the SW' will be explained.

When the switching device SW' receives a frame from, for example, a terminal TMa having an MAC (Media Access Control) address AA at a port P[1, 1], the transmission-source address AA and the identifier ([1, 1]) of the receiving port are registered in a predetermined entry (in other words, a memory address) in an address table FDB' 01. At this time, this predetermined entry is determined by a hash calculation using the transmission-source address AA and an internal identifier IVID (0.1 in this case) set to a port group to which the receiving port P[1, 1] belongs. Therefore, in this case, with "f( )" being used as the hash function, the transmission-source address AA and the identifier ([1, 1]) of the receiving port are registered in an entry of f(AA, 0.1) inside the FDB' 01.

Similarly, when the switching device SW' receives a frame from, for example, a terminal TMb having an MAC address BB at a port P[1, m+1], the transmission-source address BB and an identifier ([1, m+1]) of the receiving port are registered in a predetermined entry of an address table FDB' 02. At this time, this predetermined entry is shown as f(BB, 0.2) since the internal identifier IVID, which is set to a port group to which the P[1, m+1] belongs, is 0.2. In this case, note that a card (line card) number is also written in the address table with exemplifying the chassis-type switching device. However, the card number is not required in a case of a box-type switching device.

As described above, the internal identifier IVID is used as a variable of the hash function. Therefore, if there are two IVIDs (0.1, 0.2), two address tables FDB' 01 and FDB' 02 are correspondingly required. By providing the two FDB' 01 and FDB' 02, the port having the "IVID=0.1" and the port having "IVID=0.2" can be distinguished from each other, and it can be determined whether the communication band is limited as illustrated in FIG. 1 or not. Although the two address tables are separately illustrated in this case for easiness of explanation, note that the two address tables may be physically configured by one storage device. However, it is required to ensure a memory space for the "IVID=0.1" and a memory space for the "IVID=0.2" in the one storage device.

Next, a method of retrieving a transmission-destination address in the switching device SW' will be explained. In this case, it is assumed that the SW' receives a frame FL whose transmission source is a terminal TMc and whose transmission destination is a terminal TMa at the port P[1, n]. In this case, the FL contains a VLAN-use identifier VID or others with exemplifying a tag VLAN in addition to a transmission-source address SA and a transmission-destination address DA. In this case, the SA is an MAC address CC of the TMc, the DA is an MAC address AA of the TMa, and the VID is "1". When the SW' receives the FL, the SW' retrieves an identifier of the port corresponding to the transmission-destination address AA from the address table.

In the retrieval of the address table, the switching device SW' checks whether the MAC address AA exists or not so as to target on a broad cast domain (in this case, VLAN-use identifier VID=1) to which the port P[1, n] belongs. Since the two address tables FDB' 01 and FDB' 02 exist in the broad cast domain, the SW' is required to check whether the MAC address AA exists or not so as to target on both of the FDB' 01 and FDB' 02 as retrieval targets. Therefore, the SW' is required to perform a reading process for an entry inside the FDB' 01 obtained by the hash calculation of f(AA, 0.1) and a reading process for an entry inside the FDB' 02 obtained by the hash calculation of f(AA, 0.2).

As described above, when the relay operation as illustrated in FIG. 9 is used, much time is required for the retrieval since the process for retrieving the address table is required twice, and therefore, there is a risk of reduction in a speed of the relay operation in the switching device. Moreover, since two address tables are required, it is required to increase a capacity of the storage device forming the address tables, and therefore, there is a risk of increase in a device cost.

<<Relay Operation of Network Relay Device (Present Embodiment)>>

Figure 2:
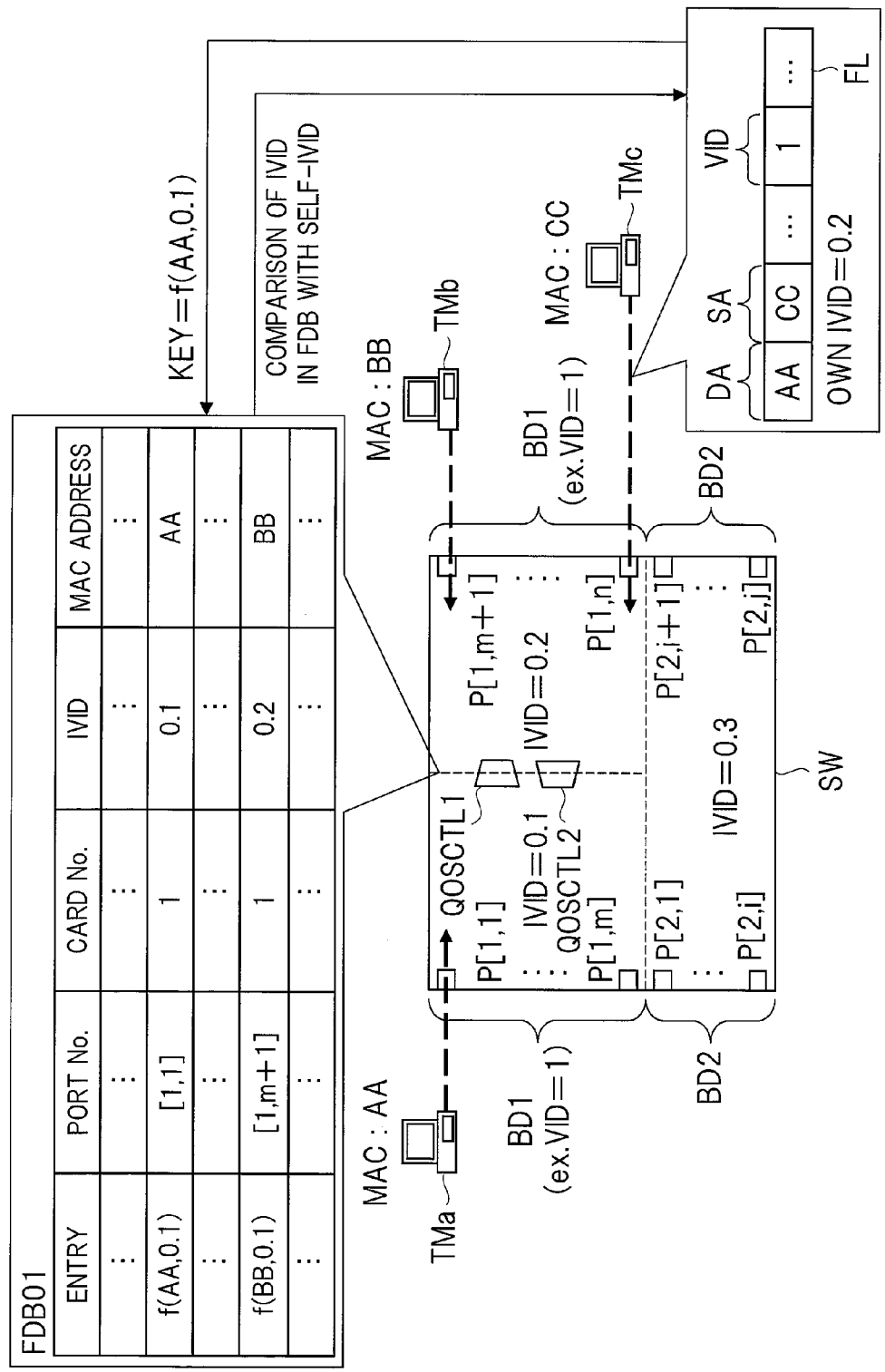
FIG. 2 is a schematic diagram illustrating an example of a relay operation of the network relay device according to one embodiment of the present invention.

FIG. 2 is a schematic diagram illustrating an example of a relay operation of the network relay device according to one embodiment of the present invention. FIG. 2 illustrates the switching device SW explained in FIG. 1. First, a method of learning a transmission-source address in the SW will be explained.

When the switching device SW receives a frame from a terminal TMa at a port P[1, 1], the transmission-source address AA, the identifier ([1, 1]) of the receiving port, and an internal identifier IVID (0.1 in this case) set to a port group to which the port belongs are registered in a predetermined entry (in other words, a memory address) in an address table FDB01. At this time, as similar to the case of FIG. 9, this predetermined entry is shown as f(AA, 0.1) by using the transmission-source address AA and the internal identifier IVID (0.1 in this case) with "f( )" being used as the hash function.

Similarly, when the switching device SW receives a frame from, for example, a terminal TMb at a port P[1, m+1], the transmission-source address BB, the identifier ([1, m+1]) of the receiving port, and the internal identifier IVID (0.2 in this case) set to a port group to which the port belongs are registered in a predetermined entry in the address table FDB01. However, the predetermined entry in this case is set to f(BB, 0.1) by using not the "IVID=0.2" as illustrated in FIG. 9 but the "IVID=0.1". In this case, note that a card (line card) number is also written with exemplifying the chassis-type switching device as similar to the case of FIG. 9. However, the card number is not required in a case of a box-type switching device.

As described above, when the transmission-source address of the frame received at either the first port group (P[1, 1] to P[1, m]) or the second port group (P[1, m+1] to P[1, n]) is learned in the switching device SW in FIG. 2, the hash calculation is performed by using the transmission-source address and one internal identifier (in this example, 0.1 (first internal identifier)) of the first and second internal identifiers in both cases. Then, in an entry inside an address table FDB01 obtained by the hash calculation, the SW registers the transmission-source address, the identifier of the port at which the frame has been received, and the internal identifier set to the port group to which this port belongs.

Next, a method of retrieving a transmission-destination address in the switching device SW will be explained. In this case, as similar to the case of FIG. 9, it is assumed that the SW receives a frame FL whose transmission source is a terminal TMc and whose transmission destination is a terminal TMa at the port P[1, n]. The FL contains a transmission-source address SA (the MAC address CC in this case), and a transmission-destination address DA (the MAC address AA in this case), a VLAN-use identifier VID ("1" in this case), and others. When the SW receives the FL, the SW retrieves an identifier of the port corresponding to the transmission-destination address AA from the address table.

In the retrieval of the address table, the switching device SW checks whether the MAC address AA exists or not so as to target on an inside of a broad cast domain (that is, VLAN-use identifier VID=1) in which the port P[1, n] is contained. Since one address table FDB01 exists in the broad cast domain as different from the case of FIG. 9, the SW is only required to check whether the MAC address AA exists or not so as to target on this FDB01 as the retrieval target. Therefore, the SW performs a reading process for an entry (for example, a memory address) inside the FDB01 obtained by the hash calculation of f(AA, 0.1). That is, when the hash calculation is performed to the frame received at the first and second port groups, the same internal identifier IVID (0.1 (first internal identifier) in this case) is used in both of the learning process of the transmission-source address and the retrieval process of the transmission-destination address.

However, the switching device SW needs to be notified of whether the communication band is limited as described in FIG. 1 or not, and therefore, it is required to determine that the frame is to be relayed so as to be either inside the same port group or be bridged between the port groups. Accordingly, the SW compares the internal identifier IVID (0.1 in this case) read out from the entry (f(AA, 0.1)) inside the address table FDB01 with an IVID (referred to as self-IVID, and is 0.2 in this case) set to the port group to which the frame-receiving port P[1, n] belongs. As a result, the SW recognizes that the frame is to be relayed bridged between the port groups since the IVIDs are different from each other, and limits the communication band of the frame by using the communication band limiting unit QOSCTL2, and then, relays the frame to the port P[1, 1].

Note that, practically in the switching device SW, it is also required to determine whether the transmission-destination address DA contained in the frame FL and the MAC address read out from the address table are matched with each other or not in addition to the determining whether the above-described internal identifiers IVID are matched with each other or not. That is, in this case, since the entry inside the address table is determined by using the hash calculation, the same entry may be calculated from a different combination of the transmission-destination address DA and the internal identifier IVID in some cases. For example, in the case of the mismatching of the MAC address, the SW floods the frame inside the broadcast domain of VLAN-use identifier "VID=1".

As described above, when the transmission-destination address of the frame received at either the first port group (P[1, 1] to P[1, m]) or the second port group (P[1, m+1] to P[1, n]) is retrieved, the switching device SW performs the hash calculation by using the transmission-destination address and the other internal identifier (0.1 (first internal identifier) in this case) which is the same as that in the learning process of the above-described transmission-destination address. Then, the SW reads out the entry inside the address table obtained by the hash calculation, and compares the internal identifier registered in the entry with the internal identifier set to the port group to which the frame-receiving port belongs, so that it is determined that the frame is to be relayed so as to be either inside the same port group or be bridged between the port groups.

Figures 3, 4:
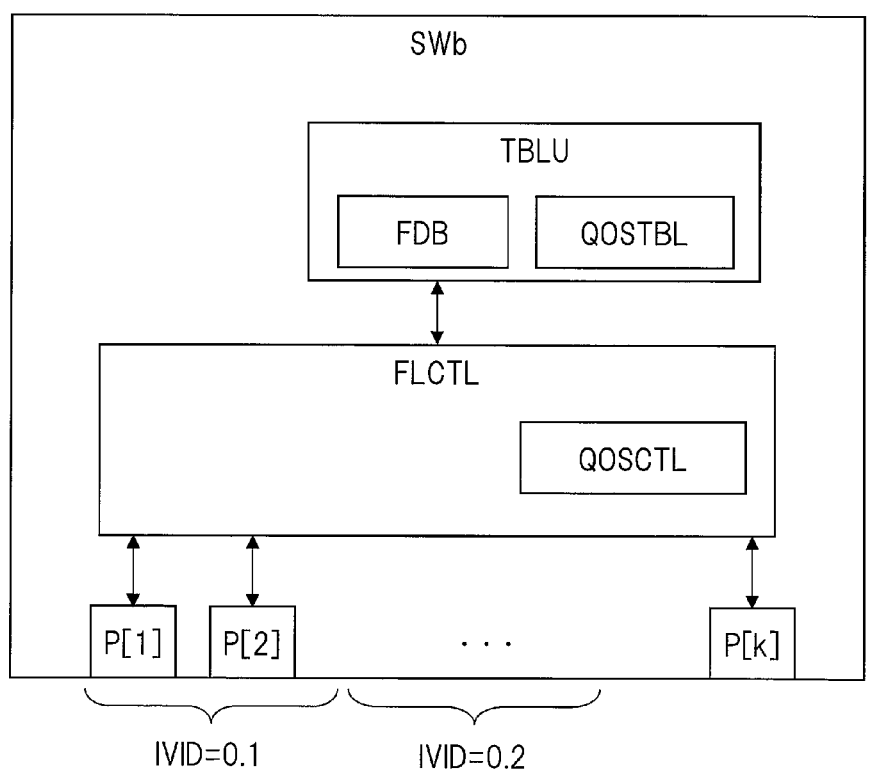
FIG. 3 is an explanatory diagram summarizing a relation example of internal identifiers used for a learning operation of a transmission-source address in the relay operations in FIG. 2.
FIG. 4 is a block diagram illustrating a schematic structural example of a principal part of a switching device of FIGS. 1 and 2.

FIG. 3 is an explanatory diagram summarizing a relational example of the internal identifiers used for the learning operation of the transmission-source address in the relay operation of FIG. 2. As illustrated in FIG. 3, when the switching device SW receives the frame, if the internal identifier IVID (self-IVID) set to the port group to which the port belongs is 0.1, the switching device SW performs the hash calculation for the address table FDB by using 0.1, and registers 0.1 in the entry in the FDB obtained by a result of the hash calculation. Moreover, if the self-IVID is 0.2, the SW performs the hash calculation for the FDB by using 0.1, and registers 0.2 in the entry in the FDB obtained by a result of the hash calculation.

Further, if the self-IVID is 0.3, the SW performs the hash calculation for the FDB by using 0.3, and registers 0.3 in the entry in the FDB obtained by a result of the hash calculation. On the other hand, when transmission-destination address is retrieved, the SW determines the self-IVID, performs the hash calculation by using a hash-calculation-use IVID corresponding to the self-IVID, and compares the self-IVID with the IVID registered in the entry inside the FDB that is obtained by the hash calculation.

As described above, by using the relay operation illustrated in FIG. 2, it is only required to retrieve the address table once as different from the case of FIG. 9, and therefore, the retrieval time can be shortened, and a speed of the relay operation in the switching device can be increased. Moreover, since only one address table is required, the capacity of the storage device forming the address table can be reduced, the device cost can be reduced.

<<Schematic Structure and Schematic Operation of Principal Part of Network Relay Device>>

FIG. 4 is a block diagram illustrating a schematic structural example of a principal part of the switching device of FIGS. 1 and 2. A switching device (network relay device) SWb illustrated in FIG. 4 is, for example, a box-type switching device, and has a frame processing unit FLCTL, a table unit TBLU, and a plurality of ports P[1], P[2], . . . , P[k]. For example, any one/some of the ports P[1], P[2], . . . , P[k] corresponds to a first port group P[1, 1] to P[1, m], illustrated in FIGS. 1 and 2, and the other(s) corresponds to a second port group P[1, m+1] to P[1, n].

The table unit TBLU has an address table FDB, a band limiting table QOSTBL, and others. The FDB is configured by, for example, a storage device such as SRAM (Static Random Access Memory), and corresponds to the FDB01 illustrated in FIG. 2 or others. The QOSTBL described in detail later, stores information indicating that the communication band is limited between the first internal identifier and the second internal identifier and information indicating which one of the first internal identifier and the second internal identifier is used in the hash calculation. Moreover, the TBLU also stores a relation between each port group and the internal identifier IVID set to each port group as illustrated in FIG. 1 or others.

The frame processing unit FLCTL has a communication band limiting unit QOSTBL as illustrated in FIG. 1 or others. The FLCTL schematically relays the frame to/from each of the ports P[1], P[2], . . . , P[k] based on the address table FDB and the band limiting table QOSTBL inside the table unit TBLU, and besides, limits the communication band by using the QOSTBL if needed.

Figure 5:
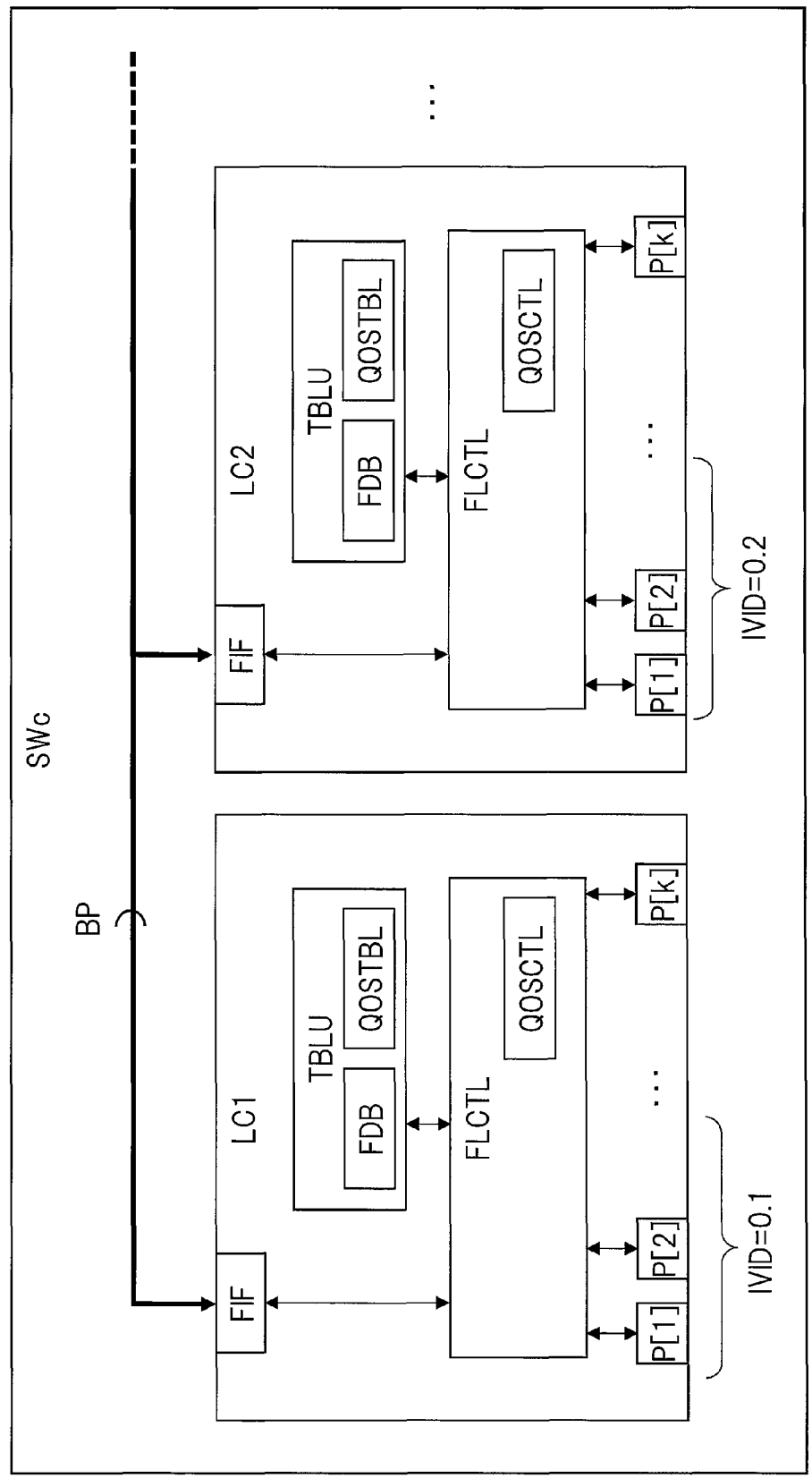
FIG. 5 is a block diagram illustrating another schematic structural example of the principal part of the switching device of FIGS. 1 and 2, another structural example being different from that of FIG. 4.

FIG. 5 is a block diagram illustrating a schematic structural example of a principal part of the switching device of FIGS. 1 and 2, the schematic structural example being different from that of FIG. 4. A switching device (network relay device) SWc illustrated in FIG. 5 is, for example, a chassis-type switching device, and has a structure in which a plurality of line cards LC1, LC2, . . . , are mounted on one package. Each of the LC1, LC2, . . . , is provided with the same internal structure as that of the switching device illustrated in FIG. 4, and is further provided with a fabric interface FIF in addition to this structure. The FIF is an interface used for connecting between the line cards via an internal communication line. The internal communication line is provided on, for example, a back plane BP having a plurality of slots to which the respective line cards are inserted.

As described in FIG. 4, the frame processing unit FLCTL schematically relays the frame to/from each of the ports P[1], P[2], . . . , P[k] of its own based on the address table FDB and the band limiting table QOSTBL in the table unit TBLU, and besides, limits the communication band by using the communication band limiting table QOSTBL if needed. In addition to this process, based on the FDB and the QOSTBL in the BTL, the FLCTL also relays the frame to/from the other line cards via the fabric interface FIF, and besides, limits the communication band by using the QOSTBL if needed.

Although not particularly limited, any one/some of the plurality of ports P[1], P[2], . . . , P[k] in the line card LC1 corresponds to a first port group P[1, 1] to P[1, m] in FIGS. 1 and 2, and any one/some of the plurality of ports P[1 ], P[2], . . . , P[k] corresponds to a second port group P[1, m+1] to P[1, n]. Under this premise, for example, when the frame whose transmission destination is the port P[1] (that is set to "IVID=0.2") of the LC2 is received at the port P[1] (that is set to "IVID=0.1") of the LC1, the frame processing unit FLCTL of the LC1 first acquires a card of the transmission destination and a port thereof based on the address table as illustrated in FIG. 2. Then, either the communication band limiting unit QOSTBL in the LC1 or the communication band limiting unit QOSTBL in the LC2 limits the communication band when the frame is relayed from the LC1 to the LC2 via the fabric interface FIF.

Normally, the chassis-type switching device rather than the box-type switching device is required to perform the high-speed relay operation, and besides, is connected with more terminals or others, and requires the address table for each line card. Therefore, the capacity of the storage device of the entire device is larger. Thus, while the beneficial effects can be obtained for the switching device of the present embodiment regardless of the box type or the chassis type, the effects more remarkable in the chassis type.

<<Configuration of Band Limiting Table>>

Figures 6, 7:
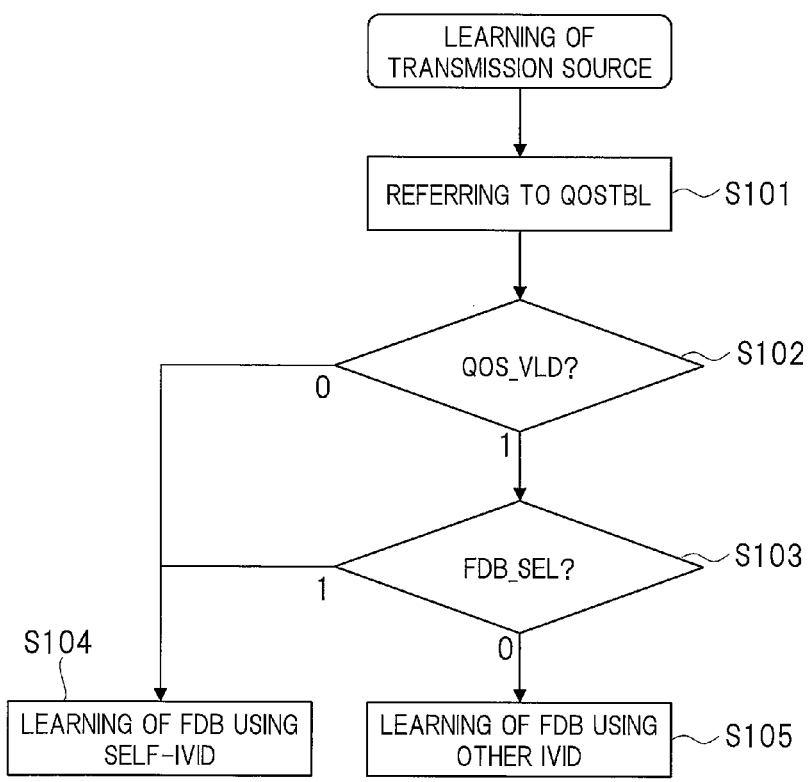
FIG. 6 is a schematic diagram illustrating a structural example of a band limiting table of the switching device illustrated in FIGS. 4 and 5.
FIG. 7 is a flowchart illustrating a detailed operational example operated when a frame processing unit of the switching device of FIGS. 4 and 5 learns a transmission-source address.

FIG. 6 is a schematic diagram illustrating a structural example of a band limiting table in the switching device of FIGS. 4 and 5. The band limiting table QOSTBL of FIG. 6 stores information indicating that the communication band is limited between the self-IVID and the other IVID. As described above, the self-IVID is an internal identifier IVID set, when the frame is received at a port, to a port group to which the port belongs. The other IVID is an IVID of the port group which is set so as to limit the communication band to/from the port group of the self-IVID.

For example, a case of the self-IVID of 0.1, the other IVID of 0.2, and a QOS effective bit QOS_VLD of "1", means that the limitation of the communication band in the relay of the frame from the port group with the self-IVID=0.1 (that is, the first internal identifier) to the port group with the other IVID=0.2 (that is, the second internal identifier) is valid (QOS_VLD="1"). On the other hand, a case of the QOS_VLD of "0" means that the limitation of the communication band is invalid (that is, the communication band is not limited). In the example of FIG. 6, in a case of the self-IVID of 0.3, the communication band is not limited.

Further, the band limiting table QOSTBL of FIG. 6 stores an address table selection bit FDB_SEL. The FDB_SEL is the information indicating which one of the first internal identifier and the second internal identifier is used in the hash calculation described in FIG. 2 or others. In a case of "FDB_SEL=1", the self-IVID is used in the hash calculation. In a case of "FDB_SEL=0", the other IVID is used in the hash calculation. Therefore, for example, in a case of "self-IVID=0.1 (that is, the first internal identifier)" and "FDB SEL=1", 0.1 (the first internal identifier) is used as the IVID in the hash calculation. Moreover, in a case of "self-IVID=0.2 (that is, the second internal identifier)", "other IVID=0.1 (the first internal identifier)", and "FDB SEL=0", 0.1 (the first internal identifier) is used as the IVID in the hash calculation.

Note that the band limiting table QOSTBL of FIG. 6 further stores a memory address ADDR corresponding to each self-IVID. The ADDR is a so-called pointer address, and means, for example, a memory address "0x30001" to be referred to when the self-IVID is 0.1. Moreover, practically, in this memory address "0x30001", the information of the QOS effective bit QOS_VLD, the other IVID, and the address table selection bit FDB_SEL and others are stored.

<<Learning Operation of Transmission-Source Address>>

FIG. 7 is a flowchart illustrating a detailed operational example in the learning process of the transmission-source address by the frame processing unit in the switching device of FIGS. 4 and 5. In FIG. 7, when the frame processing unit FLCTL receives the frame at a port, the frame processing unit FLCTL first recognizes the internal identifier IVID (that is, self-IVID) set to a port group to which the port belongs, and refers to various pieces of information corresponding to the self-IVID inside the band limiting table QOSTBL (step S101). Next, the FLCTL determines the QOS effective bit QOS_VLD inside the QOSTBL (step S102). In a case of the QOS_VLD of "0 (that is, invalid)", the FLCTL performs the hash calculation by using the self-IVID and the transmission-source address inside the frame, and registers various pieces of information as described in FIG. 2 in an entry inside the address table FDB obtained by the hash calculation (step S104).

On the other hand, in a case of the QOS effective bit QOS_VLD of "1 (that is, valid)" in step S102, the frame processing unit FLCTL determines the address table selection bit FDB_SEL (step S103). In a case of the FDB_SEL of "1", the FLCTL performs the process of the above-described step S104. On the other hand, in a case of the FDB_SEL of "0", the FLCTL performs the hash calculation by using the other IVID and the transmission-source address inside the frame, and registers various pieces of information as described in FIG. 2 in an entry inside the address table FDB obtained by the hash calculation (step S105).

For example, when frame is received at the port P[1] of the line card LC1 of FIG. 5, the frame processing unit FLCTL recognizes "self-IVID=0.1", and refers to the memory address "0x30001" based on FIG. 6, so that "QOS_VLD=1", "other IVID=0.2", and "FDB_SEL =1" are obtained (step S101). As a result, the FLCTL proceeds to step S102→step S103→step S104 so as to learn the transmission-source address by using "self-IVID=0.1".

For example, when the frame is received at the port P[1] of the line card LC2 of FIG. 5, the frame processing unit FLCTL recognizes "self-IVID=0.2", and refers to a memory address "0x30002" based on FIG. 6, so that "QOS_VLD=1", "other IVID=0.1", and "FDB_SEL=0" are obtained (step S101). As a result, the FLCTL proceeds to step S102→step S103→step S105 so as to learn the transmission-source address by using "other IVID=0.1".

<<Retrieval Operation for Transmission-Destination Address>>

Figure 8:
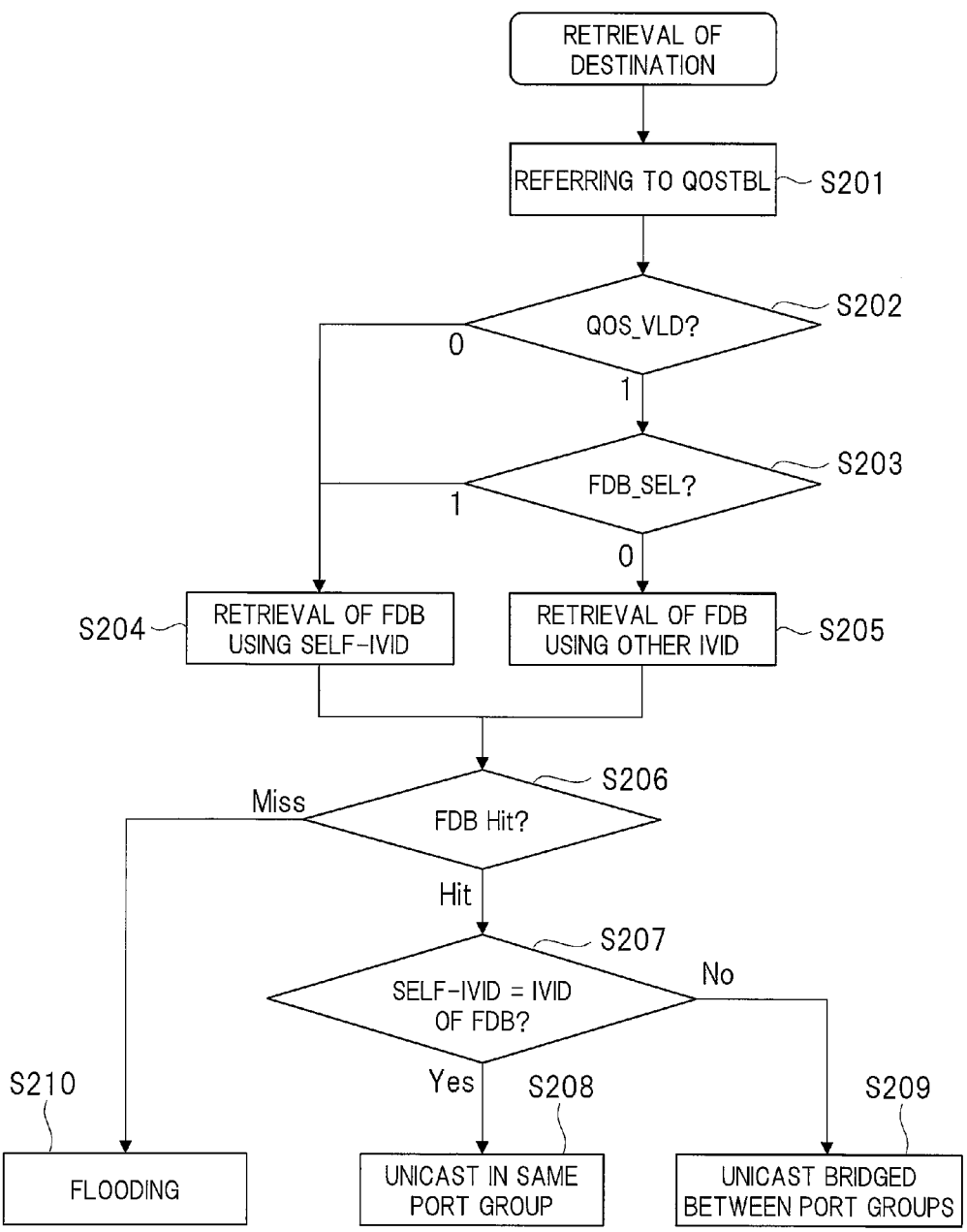
FIG. 8 is a flowchart illustrating a detailed operational example operated when the frame processing unit of the switching device of FIGS. 4 and 5 retrieves a transmission-destination address.

FIG. 8 is a flowchart illustrating a detailed operational example in the retrieval process of the transmission-destination address by the frame processing unit in the switching device of FIGS. 4 and 5. In FIG. 8, when the frame processing unit FLCTL receives the frame at the port, the frame processing unit FLCTL recognizes the self-IVID, and performs the case classification based on the band limiting table QOSTBL as similar to the steps S101 to S103 illustrated in FIG. 7 (steps S201 to S203).

Then, in step S204 of FIG. 8 corresponding to step S104 in FIG. 7, the frame processing unit FLCTL performs the hash calculation by using the self-IVID and the transmission-destination address inside the frame, and retrieves the entry inside the address table FDB obtained by the hash calculation. Similarly, in step S205 of FIG. 8 corresponding to step S105 of FIG. 7, the frame processing unit FLCTL performs the hash calculation by using the other IVID and the transmission-destination address inside the frame, and retrieves the entry inside the address table FDB obtained by the hash calculation.

Next, the frame processing unit FLCTL determines that the entry inside the address table FDB is hit or mishit in the process of step S204 or S205 (step S206). As illustrated in FIG. 2, while the hit is determined if the MAC address registered in the entry inside the FDB and the transmission-destination address contained in the frame are matched with each other, the mishit is determined if they are not matched with each other. In the case of the mishit, the FLCTL floods the frame inside the broadcast domain as illustrated in FIG. 1 (step S210).

On the other hand, in the case of the hit in step S206, the frame processing unit FLCTL judges whether the self-IVID and the internal identifier IVID read out from the entry inside the address table FDB are matched with each other or not (step S207). In the case of the matching, the FLCTL determines that the relay is performed inside the same port group, and relays the frame to the port registered in the entry inside the FDB in unicast transmission (step S208). On the other hand, in the case of the mismatching, the FLCTL determines that the frame is to be relayed so as to be bridged between the port groups, and relays the frame to the port registered in the entry inside the FDB in the unicast transmission, and limits the communication band during this relay (step S209).

For example, when a frame whose destination is the port P[1] of the LC2 is received at the port P[1] of the line card LC1 of FIG. 5, the frame processing unit FLCTL of the LC1 recognizes "self-IVID=0.1", and refers to the memory address "0x30001" based on FIG. 6, so that "QOS_VLD=1", "other IVID=0.2", and "FDB_SEL=1" are obtained (step S201). As a result, the FLCTL proceeds to step S202→step S203→step S204 so as to retrieve the transmission-destination address by using "self-IVID=0.1".

In this case, from the learning operation of the transmission-source address as described in FIG. 7, it is supposed by referring to FIG. 2 that the identifier ([1]) of the port, the card No. ("2"), "IVID=0.2", and the transmission-destination address (MAC address) are registered in the entry inside the address table FDB obtained by the hash calculation using "IVID=0.1" and the transmission-destination address. As a result, the frame processing unit FLCTL of the line card LC1 proceeds to step S206→step S207→step S209 so as to relay the frame to the port P[1] of the line card LC2. However, in this case, the FLCTL of either the LC1 or LC2 limits the communication band.

Moreover, for example, when a frame whose destination is the port P[2] of the LC2 is received at the port P[1] of the line card LC2 of FIG. 5, the frame processing unit FLCTL of the LC2 recognizes "self-IVID=0.2", and refers to the memory address "0x30002" based on FIG. 6, so that "QOS_VLD=1", "other IVID=0.1", and "FDB_SEL=0" are obtained (step S201). As a result, the FLCTL proceeds to step S202→step S203→step S205 so as to retrieve the transmission-destination address by using "other IVID=0.1".

In this case, from the learning operation of the transmission-source address as described in FIG. 7, it is supposed by referring to FIG. 2 that the identifier ([2]) of the port, the card No. ("2"), "IVID=0.2", and the transmission-destination address (MAC address) are registered in the entry inside the address table FDB obtained by the hash calculation using "IVID=0.1" and the transmission-destination address. As a result, the frame processing unit FLCTL of the line card LC2 proceeds to step S206→step S207 (both are 0.2)→step S208 so as to relay the frame to the port P[2] of the line card LC2.

In the foregoing, the invention made by the present inventor has been concretely described based on the embodiment. However, it is needless to say that the present invention is not limited to the foregoing embodiment and various modifications and alterations can be made within the scope of the present invention. For example, the above-described embodiment has been explained in detail for easily understanding the present invention, but is not always limited to the ones including all structures explained above. Also, a part of the structure of one embodiment can be replaced with the structure of the other embodiment, and besides, the structure of the other embodiment can be added to the structure of one embodiment. Further, the other structure can be added to/eliminated from/replaced with a part of the structure of each embodiment.

For example, FIG. 1 illustrates an example in which the same VLAN-use identifier "VID=1" is assigned to the first port group P[1, 1] to P[1, m] and the second port group P[1, m+1] to P[1, n]. However, the same identifier is not always required. For example, in a case that the relay is permitted between the VLAN-use identifier assigned to the first port group and the VLAN-use identifier assigned to the second port group in the switching device SW or other case, such a problem as described in FIG. 9 arises. Therefore, even in such a case, it is beneficial to use the system of the present embodiment.

Moreover, in this case, the configuration in which the respective ports in the same broadcast domain are assigned to two port groups has been exemplified. However, the ports can be assigned to three or more port groups, and the address table can be registered and retrieved by using the same internal identifier to these port groups. Moreover, in this case, the MAC address and the internal identifier IVID are used as the variables for the hash function. However, another variable may be of course further added thereto. Further, in this case, the explanation has been made by exemplifying the communication band limiting function for limiting the communication band in the relay operation operated so as to be bridged between the port groups. However, the communication band limiting function is not limited to this function, and any function may be similarly applied so as to obtain the same effects as long as the function in which the relay operation is separately used depending on either the relay operation operated so as to be bridged between the port groups or the relay operation operated so as not to be bridged between the port groups.

What is claimed is:

1. A network relay device comprising:
   a plurality of ports including a first port group to which a first internal identifier is set and a second port group to which a second internal identifier is set;
   an address table; and
   a frame processing unit for relaying a frame to/from the plurality of ports based on the address table,
   wherein, when a transmission-source address of a frame received at the first port group and the second port group is learned, the frame processing unit performs a hash calculation for the first port group and the second port group by using the transmission-source address and one of the first internal identifier and the second internal identifier, the one of the first internal identifier and the second internal identifier being used for performing the hash calculation for both of the first port group and the second port group, and registers the transmission-source address, an identifier of a port at which the frame has been received, and the internal identifier set to the port group to which the port belongs, in an entry inside the address table obtained by the hash calculation, and
   wherein, when a transmission-destination address of the frame received at the first port group and the second port group is retrieved, the frame processing unit performs a hash calculation by using the transmission-destination address and the same one of the internal identifiers as the internal identifier used in the learning, reads out an entry inside the address table obtained by the hash calculation, and compares the internal identifier registered in the entry with an internal identifier set to the port group to which a port, at which the frame has been received, belongs, so that it is determined that the frame is to be relayed so as to be either inside the same port group or be bridged between the port groups.

2. The network relay device according to claim 1,
   wherein, when the frame is to be relayed so as to be inside the same port group, the frame processing unit relays a frame received at any one of ports in the same port group to the other one of the ports without limiting a communication band of the frame, and
   wherein, when the frame is to be relayed so as to be bridged between the port groups, the frame processing unit limits a communication band of the frame received at one of the port groups, and then, relays the frame to the other of the port groups.

3. The network relay device according to claim 2, further comprising:
   a band limiting table for storing information indicating that the communication band is limited between the first internal identifier and the second internal identifier and information indicating which one of the first internal identifier and the second internal identifier is used in the hash calculation,
   wherein, when the transmission-source address is learned and when the transmission-destination address is retrieved, the frame processing unit refers to the band limiting table.

4. The network relay device according to claim 3,
   wherein the first port group and the second port group belong to the same broad cast domain.

5. The network relay device according to claim 4,
   wherein the network relay device has a configuration of a chassis type.

* * * * *